United States Patent [19]

Komeiji et al.

[11] 4,166,751

[45] Sep. 4, 1979

[54] METHOD FOR SETTING GYPSUM UTILIZING RETARDER

[75] Inventors: Azuma Komeiji; Nobuo Murakami, both of Sodegaura, Japan

[73] Assignee: Idemitsu Kosan Co., Ltd., Tokyo, Japan

[21] Appl. No.: 940,567

[22] Filed: Sep. 8, 1978

Related U.S. Application Data

[62] Division of Ser. No. 823,223, Aug. 10, 1977, abandoned.

[30] Foreign Application Priority Data

Apr. 9, 1977 [JP] Japan .................................. 52/39962
Apr. 18, 1977 [JP] Japan .................................. 52/43507

[51] Int. Cl.² ............................................ C04B 11/18
[52] U.S. Cl. ..................................... 106/112; 106/315
[58] Field of Search ....................... 106/112, 113, 315; 260/112 R, 117, 119, 121, 123

[56] References Cited

U.S. PATENT DOCUMENTS 3,951,735  4/1976  Kondo et al. ......................... 106/112

*Primary Examiner*—James Poer
*Attorney, Agent, or Firm*—Frishauf, Holtz, Goodman & Woodward

[57] ABSTRACT

A process for setting gypsum which comprises incorporating carboxyalkylated protein as a setting retarder in gypsum paste in an amount of 0.001 to 5% by weight based upon the weight of the gypsum.

19 Claims, No Drawings

METHOD FOR SETTING GYPSUM UTILIZING RETARDER

This is a division, of application Ser. No. 823,223, filed Aug. 10, 1977, now abandoned.

BACKGROUND OF THE INVENTION

1. Field of the Invention

The present invention relates to a retarder for setting of gypsum and a process for setting gypsum. More particularly, the present invention is concerned with a retarder containing a carboxyalkylated protein as the active component thereof for use in setting of gypsum and an effective process for setting gypsum by the use of the retarder.

2. Description of the Prior Art

Gypsum, particularly hemihydrate gypsum is widely used in construction material, pottery material, etc., and those hemihydrate gypsums commercially available on the market produced by calcination usually contain anhydrous gypsum and gypsum dihydrate. Molding of such hemihydrate gypsum, however, has been quite difficult on account of the high setting speed of the paste thereof. Therefore, in molding gypsum for various kinds of uses, keratin type animal proteins such as gelatin, or citric acid or its salts have hitherto been added as retarders for setting of gypsum, thereby reducing the setting speed of gypsum and increasing workability such as molding, etc.

However, where the above described animal protein is used as a retarder for setting of gypsum, the disadvantages occur in that it has a poor solubility in cold water, it is putrefactive and that the strength of the set gypsum decreases with an increase in the amount of the animal protein added. Furthermore, its retarding effect is not sufficient and the supply of the animal protein has often been limited.

Recently, a retarder composed mainly of whey derived from soybean, cotton seed, sunflower, etc., (Japanese Patent Laid Open No. 143819/1975), a retarder composed mainly of water-soluble lower peptide obtained by treating a protein with an acid, alkali or protein decomposing enzyme (Japanese Patent Laid Open No. 143818/1975), a retarder composed mainly of a water-soluble condensate prepared by reacting an amino acid and an aldehyde (Japanese Patent Laid Open No. 143818/1975), etc., have been developed. With these retarders, however, only insufficient retarding effect is obtained and the disadvantage occurs in that a reduction in the strength of the set gypsum is great.

SUMMARY OF THE INVENTION

The principal object of the present invention is to provide a retarder for setting gypsum and a process for setting gypsum, which eliminate the defects of the prior art technique and markedly retard the setting speed of gypsum.

It has now been found that the above object is attained by using a carboxyalkylated protein as a retarder.

Accordingly, the present invention provides a retarder containing a carboxyalkylated protein as the active component for setting of gypsum and a process for setting gypsum comprising adding a carboxyalkylate protein in an amount of from 0.001 to 5% by weight based upon the amount of gypsum.

DETAILED DESCRIPTION OF THE INVENTION

Carboxyalkylated proteins of the present invention are prepared by carboxyalkylating proteins. Those proteins which can be used in the present invention as raw materials, are not especially limited. Microorganisms such as yeast, bacteria, mould, etc., and those proteins extracted therefrom, animal proteins such as collagen, gelatin, glue, keratin, casein, egg albumin, etc., and vegetable proteins such as soybean proteins, wheat gluten, etc., are preferably used alone or in combination with each other, as they are or after hydrolysis.

Carboxyalkylation of these proteins can be carried out by various methods. For example, a protein is dispersed in water or a water-containing organic solvent such as an alcohol, and an alkali such as sodium hydroxide or potassium hydroxide and a carboxyalkylating agent such as a monohalogeno acetic acid, e.g., monochloroacetic acid, monobromoacetic acid or $\beta$-chloropropionic acid are added thereto. The resulting mixture is then heated whereby the carboxyalkylation of the protein is accomplished.

Also, carboxyalkylation of a protein can be attained by treating the protein with acrylonitrile in the presence of an alkali and then hydrolyzing. In this case, in general, acrylonitrile is added in an amount of 1 to 50 parts by weight per 100 parts by weight of a protein, preferably 5 to 30% by weight. Where the amount of acrylonitrile to be added is less than 1 part by weight, the reaction proceeds insufficiently, and where the amount is above 50 parts by weight, side-reactions undesirably take place. Suitable examples of these alkalis include sodium hydroxide, potassium hydroxide, aqueous ammonia, barium hydroxide, calcium hydroxide and the like. The alkali concentration is 0.01 to 10 normals, preferably 0.1 to 1 normal. The reaction temperature is desirably 10° to 80° C. and the reaction period is sufficient to be 1 to 20 hours.

Where the protein treated with acrylonitrile as described above is further subjected to hydrolysis processing, the processing conditions are not especially limited. In general, the processing is carried out in an aqueous alkaline or acidic solution of a concentration as much as 0.001 to 1 normal, and in the case of the aqueous alkaline solution, further addition of a 3 to 30% aqueous solution of hydrogen peroxide accelerates effectively the hydrolysis. As the alkalis used in this processing, sodium hydroxide, potassium hydroxide, barium hydroxide, calcium hydroxide, lithium hydroxide, aqueous ammonia and the like can be suitably used. On the other hand, as the acids, hydrochloric acid, sulfuric acid, acetic acid, nitric acid, phosphoric acid and the like can be used. It is sufficient to set the reaction temperature 10° to 80° C. and the reaction period 0.5 to 3 hours. This processing hydrolyzes the nitrile group bonded to the protein.

In addition, the carboxyalkylation of a protein can be carried out by treating the protein with an $\alpha, \beta$-unsaturated aliphatic acid or its esters or salts under neutral or alkaline conditions. As these $\alpha, \beta$-unsaturated aliphatic acids and their esters or salts, those compounds represented by the general formula shown below can be used.

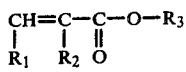

wherein $R_1$ is hydrogen, methyl or ethyl group, $R_2$ is hydrogen, methyl, ethyl or propyl group, and $R_3$ is hydrogen, methyl, ethyl, propyl, tert-butyl group, alkali metal or alkali earth metal.

Representative examples of the compounds shown by the above general formula include acrylic acid, methyl acrylate, ethyl acrylate, butyl acrylate, methacrylic acid, methyl methacrylate, ethyl methacrylate, butyl methacrylate, crotonic acid, methyl crotonate, ethyl crotonate, butyl crotonate, α-ethylacrylic acid, methyl α-ethylacrylate, ethyl α-ethylacrylate, butyl α-ethylacrylate, and the like, and the alkali metal (e.g., sodium, potassium, lithium, etc.,) or alkali earth metal (e.g., calcium, magnesium, etc.) salts of acrylic acid, methacrylic acid, crotonic acid, α-ethylacrylic acid and the like, etc. α,β-unsaturated aliphatic acids which are prepared by the hydrolysis of the corresponding esterified compound can also be used.

Those conditions under which a protein is treated with an α, β-unsaturated aliphatic acid or its ester or salt represented by the above general formula, are not especially limited. In general, an α, β-unsaturated aliphatic acid or its ester or salt is added in an amount of 0.1 to 100% by weight, preferably 5 to 40% by weight based upon the amount of the protein, and the reaction is carried out under neutral or alkaline conditions. Where the amount of an α, β-unsaturated aliphatic acid or its ester or salt to be added is less than 0.1% by weight, the reaction proceeds insufficiently, and where the amount is above 100% by weight, side-reactions undesirably take place. For adjusting the pH of the reaction system, sodium hydroxide, potassium hydroxide, lithium hydroxide, aqueous ammonia, barium hydroxide, calcium hydroxide, and the like can be suitably used, if desired.

In case that among the compounds represented by the above general formula, in particular, esters are used, it is preferred that the reaction is carried out under the conditions of a pH of 7 to 13, a reaction temperature of 20° to 120° C. and a reaction period of 5 minutes to 24 hours. On the other hand, in the case of free acids such as acrylic acid or their salts, it is desirable that the reaction temperature is from room temperature to 200° C., preferably not less than 50° C. and the reaction period is from 5 minutes to 48 hours. The rate of reaction is high in a concentrated solution, and it is possible to most simply and sufficiently carry out the reaction by continuously concentrating and drying on heating under ordinary pressure or reduced pressure.

Where a carboxyalkylated protein is produced by the use of an ester represented by the above general formula, it is necessary to subject the esterified protein a hydrolysis processing. This hydrolysis processing is preferably carried out at a pH of not more than 2 or not less than 13 by the use of an acid or alkali. Those acids which can be used in this case, include inorganic acids such as hydrochloric acid, sulfuric acid, nitric acid, phosphoric acid and the like, and organic acids such as acetic acid and the like, and as alkalis, sodium hydroxide, potassium hydroxide, barium hydroxide, calcium hydroxide, lithium hydroxide, ammonia and the like can be used. The hydrolysis processing is carried out at a temperature of 20° to 120° C. for 5 minutes to 24 hours.

While the thus obtained carboxyalkylated proteins can be effectively used as a retarder for setting of gypsum as it is, those carboxyalkylated proteins further subjected to a heat-concentrating processing or heat-drying processing can also be used effectively. In this case, the heat-concentrating or heat-drying processing is carried out at a temperature of 50° to 200° C. under ordinary pressure or reduced pressure under neutral or alkaline condition for a specific period of time. The application of the heat-concentrating or heat-drying processing enables to effectively react hydrolyzates produced as by-products at the above reaction stage, such as acrylic acid and the like. In case that the heat processing is carried out at a temperature of less than 50° C., the above effect cannot be obtained sufficiently, and above a temperature of more than 200° C., the products formed are undesirably insoluble.

In producing carboxyalkylated proteins by the above described various methods, carboxymethylated proteins, carboxyethylated proteins, carboxypropylated proteins and the like are formed depending upon the kind of the reagents to be used. In the present invention, all of these proteins can be used as retarders for setting of gypsum, and in particular, carboxyethylated proteins has a great effect of retarding the setting of gypsum.

In more detail, those modified proteins prepared by carboxyethylating a raw protein, which has been obtained by hydrolyzing one or more materials selected from keratin, collagen, glue, gelatin and casein, by the above described methods are most suitable.

In the present invention, while the amount of the carboxyalkyl group to be contained in a carboxyalkylated protein is not especially limited and is suitably determined according to the desired extent to which the setting of gypsum is retarded, the amount is preferably 0.1 to 30% by weight based upon the total weight of the carboxyalkylated protein. The controlling of the amount of carboxyalkyl group in the above range can be easily effected by the above described methods.

By adding a suitable amount of a retarder of the present invention at a time of molding gypsum paste can be obtained a remarkable effect of retarding the setting of the paste.

Hereinafter, a process for setting gypsum by the use of a retarder of the present invention will be explained.

In producing a mold of gypsum by adding a suitable amount of water to gypsum to form a gypsum paste and then setting the gypsum paste, the above described carboxyalkylated protein is added in an amount of 0.001 to 5 parts by weight, preferably 0.01 to 1 part by weight per 100 parts by weight of gypsum. Where the amount of the carboxyalkylated protein to be added is less than 0.001 part by weight, it is not possible to retard the setting speed of gypsum sufficiently and thus it is difficult to increase workability. On the other hand, where the amount of the carboxyalkylated protein is more than 5 parts by weight, the time needed for the setting is unpractically lengthened. Where the carboxyalkylated protein is in the solution state, it may be used either as it is or after being dried.

Gypsums to which the process of the present invention can be applied, are not especially limited; that is to say, the process of the present invention can be applied to any gypsums so long as they have a rapid setting speed as compared with operating speed in molding, etc., thereby resulting in the formation of difficulties in operation. In general, the process of the present invention can be suitably applied to α-type or β-type hemihydrate gypsum and hemihydrate gypsum on the market, i.e., α-type or β-type hemihydrate gypsum containing anhydrous gypsum and dihydrate gypsum as impurities.

As described above, the use of the retarder for setting of gypsum and the process of the present invention enables to retard the setting speed of gypsum remarkably, and at the same time, since the carboxyalkylated protein is easily soluble in water, it is possible to increase operating in molding efficiency. In addition, the treatment of proteins with acrylonitrile, an α, β-unsaturated aliphatic acid or the like is simple in handling, resulting in little loss of the proteins. According to the present invention, the time required for setting a gypsum paste is 2 to 5 times longer than that of a gypsum paste containing a protein itself. Therefore, with those gypsums whose setting speed can be retarded to a certain extent by the use of a protein itself, the amount of a retarder to be added thereto can be reduced by the use of a carboxyalkylated protein of the present invention. Furthermore, those proteins having no retarding effect can be used as retarders by carboxyalkylation thereof according to the methods as described above. As a result, the raw materials can be saved and at the same time, the scope of the raw materials to be supplied can be enlarged since it is now possible to employ various kinds of proteins as raw materials. Moreover, the advantage is obtained in that there is observed little reduction in the strength of the set gypsum.

Since carboxyalkylated proteins constituting the active component of a retarder for setting of gypsum of the present invention can be used under neutral conditions, the process of the present invention is advantageous in operation and working environment. Since carboxyalkylated proteins having uniform quality can be produced stably, the process of the present invention is of high practical value.

The retarders and process of the present invention can be effectively used in molding construction material, pottery, medical equipments, etc., or in producing various kinds of molds and statues, and it is possible to eliminate those troubles encountered in operation and to increase the quality of the products.

The present invention will be explained in more detail by reference to the following examples.

EXAMPLE 1

Into a 1 liter, three-necked flask were introduced 50 grams of gelatin on the market (crude protein content: 95.2% by weight) and 250 milliliters of 95% isopropyl alcohol, and the gelatin was well dispersed in the isopropyl alcohol. Then, 45 milliliters of a 50% solution of caustic soda in water and 19 grams of monochloroacetic acid were added thereto while maintaining the contents of the flask at 10° to 20° C., and the resulting mixture was stirred for 1 hour. The mixture was reacted on a water bath maintained at 70° C. for 3 hours.

After the reaction was completed, the reaction mixture was cooled down to 20° C. and adjusted to pH 4 with hydrochloric acid. The reaction mixture was then filtered and the precipitate obtained was washed with a 80% solution of methyl alcohol in awater. After the washing, the precipitate was further dispersed in a 80% solution of methyl alcohol in water, adjusted to pH 7 with caustic soda and filtered. The precipitate was dehydrated with 99.5% methyl alcohol and air-dried, and thus a water-soluble powder having a carboxymethyl content of 7.1% by weight was obtained.

The thus obtained carboxymethylated protein was dissolved in 60 milliliters of water and 150 grams of α-type hemihydrate gypsum was added thereto with stirring whereby a gypsum paste was obtained.

The exothermic state of the gypsum paste obtained above due to heat of hydration was measured with a lapse of time on a calorimeter (trade name: Multi Coder MC-611; produced by Watanabe Sokki Seisakusho). The exothermic peak so obtained is shown in Table 1 as an apparent setting time of the gypsum.

EXAMPLE 2

The procedure of Example 1 was repeated with the exception that a soybean protein on the market (crude protein content: 86.6% by weight) was used in place of the gelatin, and thus a water-soluble powder having a carboxymethyl content of 1.4% by weight was obtained.

With the thus obtained powder, the same procedure as used in Example 1 was conducted to measure the setting time of gypsum. The results obtained are shown in Table 1.

EXAMPLE 3

The procedure of Example 1 was repeated with the exception that a soybean protein on the market (crude protein content: 50.1% by weight) was used in place of the gelatin, and thus a water-soluble powder having a carboxymethyl content of 15.6% by weight was obtained.

With the thus obtained powder, the same procedure as used in Example 1 was conducted to measure the setting time of gypsum. The results obtained are shown in Table 1.

EXAMPLE 4

The procedure of Example 1 was repeated with the exception that yeast (*Candida utilis*) produced by fermentation of petroleum (crude protein content: 55% by weight) was used in place of the gelatin, and thus a water-soluble powder having a carboxymethyl content of 10.0% by weight was obtained.

With the thus obtained powder, the same procedure as used in Example 1 was conducted to measure the setting time of gypsum. The results obtained are shown in Table 1.

EXAMPLE 5

The procedure of Example 1 was repeated with the exception that an extracted yeast protein obtained by extracting yeast (*Candida utilis*) with an aqueous caustic soda solution (crude protein content: 72% by weight) was used in place of the gelatin, and thus a water-soluble powder having a carboxymethyl content of 7.2% by weight was obtained.

With the thus obtained powder, the same procedure as used in Example 1 was conducted to measure the setting time of gypsum. The results obtained are shown in Table 1.

COMPARATIVE EXAMPLES 1 TO 5

The procedure of Example 1, 2, 3, 4 or 5, respectively, was repeated with the exception that the corresponding unmodified protein, i.e., not carboxymethylated protein was used. The results obtained are shown in Table 1.

Table 1

|  | Retarder for Setting | Amount added (mg) | Time required for Setting (min.) |
|---|---|---|---|
| Example 1 | Carboxymethylated Gelatin | 15 | 151 |
|  |  | 45 | 445 |
| Comparative Example 1 | Gelatin | 15 | 73 |
|  |  | 45 | 199 |
| Example 2 | Carboxymethylated Soybean Protein | 15 | 73 |
|  |  | 45 | 270 |
| Comparative Example 2 | Soybean Protein | 15 | 52 |
|  |  | 45 | 50 |
| Example 3 | Carboxymethylated Soybean Protein | 15 | 81 |
|  |  | 45 | 141 |
| Comparative Example 3 | Soybean Protein | 15 | 52 |
|  |  | 45 | 56 |
| Example 4 | Carboxymethylated Yeast | 15 | 61 |
|  |  | 45 | 152 |
| Comparative Example 4 | Yeast | 15 | 57.6 |
|  |  | 45 | 131 |
| Example 5 | Carboxymethylated Extracted Yeast Protein | 15 | 103 |
|  |  | 45 | 190 |
| Comparative Example 5 | Extracted Yeast Protein | 15 | 73.5 |
|  |  | 45 | 118.6 |

EXAMPLE 6

A predetermined amount of the carboxymethylated gelatin obtained in Example 1 was dissolved in 112.5 milliliters of water, and 150 grams of β-type hemihydrate gypsum was added thereto with stirring. Hereinafter, the same procedure as used in Example 1 was conducted, and the time required for setting was measured.

Where the amount of the carboxymethylated gelatin added was 150 milligrams, the setting time was 44 minutes, and in the case of 450 milligrams, the setting time was 164 minutes.

COMPARATIVE EXAMPLE 6

The procedure of Example 6 was repeated with the exception that the unmodified gelatin was used in place of the carboxymethylated gelatin.

Where the amount of the gelatin added was 150 milligrams, the setting time was 31 minutes, and in the case of 450 milligrams, the setting time was 111 minutes.

COMPARATIVE EXAMPLE 7

The procesure of Example 1 was repeated with the exception that a gelatin was used which was subjected to the alkali treatment alone without monochloroacetic acid, and the setting time was measured.

Where the amount of the gelatin added was 15 milligrams, the setting time was 71 minutes, and in the case of 45 milligrams, the setting time was 129 minutes.

COMPARATIVE EXAMPLE 8

In 800 milliliters of a 6% aqueous solution of caustic soda was dissolved 100 grams of gelatin, and the resulting mixture was reacted at 90° to 100° C. for 3.5 hours. The reaction mixture was then neutralized with hydrochloric acid, and the total volume was made 10 liters by adding an ion exchanged water. Those fractions having a molecular weight of less then 6,000 were combined together by the use of a reverse osmosis filter (produced by DDS Co.) and desalted with an ion exchanged resin (Amberlite 120B).

With the thus alkali-treated gelatin (crude protein content: 99% by weight), the same procedure as used in Example 1 was conducted to measure the setting time.

Where the amount of the gelatin added was 15 milligrams, the setting time was 61 minutes, and in the case of 45 milligrams, the setting time was 101 minutes.

EXAMPLE 7

Into a 2 liter flask was introduced 50 grams of gelatin (crude protein content: 95.2%), and 500 milliliters of a 0.5N aqueous solution of sodium hydroxide was added thereto to dissolve the gelatin therein. The resulting mixture was stirred at 30° C. for 8 hours. Then, 5 grams of acrylonitrile was added thereto, and the resulting mixture was stirred for 8 hours. The thus obtained reaction mixture was neutralized with a 2 N hydrochloric acid solution, and the precipitate obtained was separated and dried.

Thereafter, 10 grams of the acrylonitrile-treated gelatin obtained above was added to 66.5 milliliters of water in which 0.4 grams of sodium hydroxide was dissolved. In addition, 33.5 milliliters of a 30% aqueous solution of hydrogenperoxide was added thereto and the mixture so prepared was subjected to hydrolysis by stirring at ordinary temperature for 2 hours. The reaction mixture was then neutralized with a 2 N aqueous solution of hydrochloric acid, and the precipitate formed was separated and dried.

The thus obtained gelatin was added to 60 milliliters of water in a predetermined amount, and 150 grams of α-type hemihydrate gypsum was added thereto with stirring to form a gypsum paste.

With the thus obtained gypsum paste, an increase in temperature due to heat of hydration was measured with Multi Coder MC-611 (produced by Watanabe Sokki Seisakusho). The time required for reaching the exothermic peak was designated an apparent setting time. For comparison, with a gelation which was subjected to the acrylonitrile processing alone, the setting time was measured. The results obtained are shown in Table 2.

Table 2

| Additive | Amount added(mg) | Setting Time(min.) |
|---|---|---|
| Acrylonitrile -hydrolysis treated Gelatin | 15 | 148 |
|  | 45 | 350 |
| Acrylonitrile | 15 | 120 |

Table 2-continued

| Additive | Amount added(mg) | Setting Time(min.) |
|---|---|---|
| treated Gelatin | 45 | 280 |

EXAMPLE 8

In 50 milliliters of a 3.5% aqueous solution of caustic soda was dissolved 10 grams of a glue for a gum tape, and the mixture was stirred at 70° C. for 3 hours to hydrolyze the glue. After the mixture was cooled, an aqueous solution of sodium acrylate (aqueous solution obtained by treating 2 grams of acrylic acid with 50 milliliters of a 2.5% aqueous solution of caustic soda) was added thereto and mixed. This solution was adjusted to pH 7.5 with 2 N hydrochloric acid and concentrated on a rotary evaporator. This concentrated solution was hot air-dried at 85° C. for 12 hours and further dried in vacuum at 85° C. for 4 hours to cause the reaction thereof.

The thus obtained dry material was dissolved in 75 milliliters of water in an amount of 0.01 grams, and 100 grams of β-type hemihydrate gypsum was added thereto with stirring. The mixture was stirred for additional 3 minutes to form a gypsum paste.

With the thus obtained gypsum paste, an increase in temperature due to heat of hydration was measured by the same method described in Example 7. The time required for reaching the peak appearing in the graph obtained was designated an apparent setting time of the gypsum. The results obtained are shown in Table 3.

EXAMPLE 9

In 200 milliliters of a 4.5% aqueous solution of caustic soda was dissolved 60 grams of a glue for a gum tape, and the mixture was stirred at 70° C. for 2 hours to hydrolyze the glue. After the solution was cooled, 12 grams of acrylic acid was added thereto and mixed.

After the pH of the above solution was adjusted to 7.5 with 2 N hydrochloric acid, the solution was concentrated to 100 milliliters. The solution was then reacted at 80° C. for 10 hours with stirring. The reaction mixture was freeze-dried and thus a dry compound was obtained.

With this dry compound, the apparent setting time was measured in the same manner as in Example 8. The results obtained are shown in Table 3.

EXAMPLE 10

The procedure of Example 8 was repeated with the exception that keratin was used in place of the glue for a gum tape. The results obtained are shown in Table 3.

Table 3

| Example | Setting Time (min.) |
|---|---|
| 8 | 305 |
| 9 | 230 |
| 10 | 240 |

EXAMPLE 11

In 50 milliliters of a 2.5% aqueous solution of caustic soda was dissolved 5 grams of the extracted yeast protein (crude protein content: 72% by weight), and the mixture was stirredaat 70° C. for 2 hours to hydrolyze the extracted yeast protein. Thereafter, 1 gram of methyl acrylate was added to the above mixture and stirred at 70° C. for 30 minutes to hydrolyze the methyl acrylate.

After cooling, the reaction mixture was adjusted to pH 7.5 with a 2 N hydrochloric acid solution and concentrated on a rotary evaporator. This concentrated solution was hot air-dried at 85° C. for 6 hours and further dried in vacuum at 80° C. for 5 hours to cause the reaction thereof.

The thus acrylate-treated yeast protein was dissolved in 60 milliliters of water in an amount of 15 milligrams or 45 milligrams, and 150 grams of α-type hemihydrate gypsum was added thereto with stirring. The mixture was stirred for additional three minutes to form a gypsum paste.

With the thus obtained gypsum paste, an increase in temperature due to heat of hydration was measured with Multi Coder MC-611 Type (produced by Watanabe Sokki Seisakusho). The time required for reaching the peak appearing in the graph obtained was designated an apparent setting time of gypsum.

Where the amount of the extracted yeast protein added was 15 milligrams, the setting time was 111 minutes, and in the case of 45 milligrams, the setting was more than 500 minutes.

EXAMPLE 12

In 50 milliliters of a 2.5% aqueous solution of caustic soda was dissolved 5 grams of gelatin (produced by Wako Pure Chemical Industries, Ltd.), and the mixture was stirred at 70° C. for 2 hours to hydrolyze the gelatin. After being cooled, the solution was adjusted to pH 12.0 with 2 N hydrochloric acid, and 1 gram of methyl acrylate was added thereto. The resulting mixture was reacted at 70° C. for 30 minutes.

After being allowed to cool down to room temperature, the solution was adjusted to pH 13.5 with a 6 N caustic soda solution and again stirred at 70° C. for 30 minutes to hydrolyze the ester. After cooling, the solution was adjusted to pH 7.5 with 2 N hydrochloric acid, and all the solution was filled up in a 500 milliliters volumetric flask to form a reaction solution.

To 1 milliliter of the reaction solution was added water to make the volume 75 milliliters, and 100 grams of β-type hemihydrate gypsum was added thereto with stirring and stirred for additional 3 hours to form a gypsum paste.

With the thus obtained gypsum paste, an increase in temperature due to heat of hydration was measured with Multi Coder MC-611 Type (produced by Watanabe Sokki Seisakusho). The time required for reaching the peak appearing in the graph obtained was designated an apparent setting time of the gypsum. The results obtained are shown in Table 4.

EXAMPLE 13

The reaction solution obtained in Example 12 of the amount of 100 milliliters was concentrated to about 20 milliliters with an evaporator, and the concentrated solution was heat-dried at 85° C. for 10 hours and dried in vaccum at 85° C. for 4 hours.

All the dry compound obtained was dissolved in water, and the resulting solution was introduced into a 100 milliliters volumetric flask and water was added to make up 100 milliliters. To 1 milliliter of this solution was added water to make up 75 milliliters. Hereinafter, the apparent setting time of the gypsum was measured in the same manner as in Example 12. The results obtained are shown in Table 4.

EXAMPLE 14

The procedure of Example 13 was repeated with the exception that the concentrated solution was dried at a temperature of less than 30° C. by the use of a freeze-drying machine in place of heat-drying and vaccum-drying. The results obtained are shown in Table 4.

EXAMPLE 15

The procedure of Example 12 was repeated with the exception that keratin was used in place of the gelatin. The results obtained are shown in Table 4.

EXAMPLE 16

The procedure of Example 13 was repeated with the exception that keratin was used in place of the gelatin. The results obtained are shown in Table 4.

EXAMPLE 17

The procedure of Example 12 was repeated with the exception that a soybean protein (crude protein content: 87.2% by weight) was used in place of the gelatin and the pH at the reaction was adjusted to 11.5 in place of 12.0. The results obtained are shown in Table 4.

EXAMPLE 18

The procedure of Example 12 was repeated with the exception that ethyl acrylate was used in place of methyl acrylate and the reaction was carried out at a temperature of 80° C. in place of 70° C. The results obtained are shown in Table 4.

EXAMPLE 19

The procedure of Example 12 was repeated with the exception that methyl methacrylate was used in place of methyl acrylate. The results obtained are shown in Table 4.

COMPARATIVE EXAMPLE 9

In 50 milliliters of a 2.5% aqueous solution of caustic soda was dissolved 5 grams of gelatin, and the mixture was stirred at 70° C. for 2 hours to hydrolyze the gelatin. After being cooled, the solution was adjusted to pH 7.5 with 2 N hydrochloric acid, and all the solution was filled up in a 500 milliliters volumetric flask.

1 milliliter of the solution was weighed, and hereinafter the same procedure as in Example 12 was conducted to measure the apparent setting time of the gypsum. The results obtained are shown in Table 4.

COMPARATIVE EXAMPLE 10

The procedure of Comparative Example 9 was repeated with the exception that keratin was used in placed of the gelatin. The results obtained are shown in Table 4.

Table 4

| Example | Setting Time(min.)* |
|---|---|
| 12 | 345 |
| 13 | 387 |
| 14 | 343 |
| 15 | 188 |
| 16 | 222 |
| 17 | 140 |
| 18 | 327 |
| 19 | 131 |
| Comparative Example 9 | 112 |
| Comparative Example 10 | 102 |

*The amount of the retarder added was 0.01 gram calculated as protein.

The alkyl moiety of the carboxyalkylated protein has from 2 to 8 carbon atoms.

What is claimed is:

1. An improved process for setting gypsum wherein water is admixed with gypsum to form a gypsum paste which then sets, the improvement comprising admixing a carboxylated protein in said gypsum paste in an amount of from 0.001 to 5% by weight based upon the weight of the gypsum, whereby the setting time of said gypsum is retarded.

2. The process of claim 1, wherein the carboxyalkylated protein has a carboxyalkyl group content of from 0.1 to 30% by weight based upon the total weight of the carboxyalkylated protein.

3. The process of claim 2, wherein the alkyl moiety of the carboxyalkylated protein has from 2 to 8 carbon atoms.

4. The process of claim 3, wherein the carboxyalkylated protein is a carboxyethylated protein.

5. The process of claim 3, wherein the carboxyalkylated protein is prepared by contacting a protein with acrylonitrile in the presence of an alkali and hydrolyzing the resulting reaction product.

6. The process of claim 3, wherein the carboxyalkylated protein is prepared by contacting a protein with an α,β-unsaturated aliphatic acid or a salt thereof under neutral or alkaline conditions.

7. The process of claim 3, wherein the carboxyalkylated protein is prepared by contacting a protein with an α,β-unsaturated aliphatic acid ester under neutral or alkaline conditions, and hydrolyzing the resulting reaction product.

8. The composition of claim 6, wherein the α,β-unsaturated aliphatic acid is acrylic acid.

9. The process of claim 1, wherein the protein is at least one material selected from the group consisting of a microorganism and a protein extracted therefrom, collagen, gelatin, glue, keratin, casein, egg albumin, soybean protein, wheat gluten, and a hydrolyzed product thereof.

10. The process of claim 1, wherein the carboxyalkylated protein is a carboxyethylated protein.

11. The process of claim 1, wherein the protein is at least one material selected from the group consisting of a microorganism and a protein extracted therefrom, collagen, gelatin, glue, keratin, casein, egg albumin, soybean protein, wheat gluten, and a hydrolyzed product thereof.

12. The process of claim 1, wherein the alkyl moiety of the carboxyalkylated protein has from 2 to 8 carbon atoms.

13. The process of claim 1, wherein said protein is in an amount of from 0.01 to 1% by weight based upon the weight of the gypsum.

14. The process of claim 13, wherein said carboxyalkylated protein is a carboxyethylated protein, and wherein said protein has a carboxyethyl group content of from 0.1 to 30% by weight based upon the total weight of the carboxyalkylated protein.

15. The process of claim 14, wherein the protein is at least one material selected from the group consisting of a microorganism and a protein extracted therefrom, collagin, gelatin, glue, keratin, casein, egg albumin, soybean protein, wheat gluten, and a hydrolyzed product thereof.

16. The process of claim 15, wherein the carboxyalkylated protein is prepared by contacting a protein with acrylonitrile in the presence of an alkali and hydrolyzing the resulting reaction product.

17. The process of claim 15, wherein the carboxyalkylated protein is prepared by contacting a protein with an $\alpha,\beta$-unsaturated aliphatic acid ester under neutral or alkaline conditions, and hydrolyzing the resulting reaction product.

18. The process of claim 15, wherein the carboxyalkylated protein is prepared by contacting a protein with an $\alpha,\beta$-unsaturated aliphatic acid or a salt thereof under neutral or alkaline conditions.

19. The process of claim 18, wherein the $\alpha,\beta$-unsaturated aliphatic acid is acrylic acid.

* * * * *